US011344947B2

(12) United States Patent
Song

(10) Patent No.: US 11,344,947 B2
(45) Date of Patent: May 31, 2022

(54) METHOD FOR FORMING BATTERY BRACKET BY SEMI-SOLID DIE CASTING

(71) Applicant: Qingdao Yuyuan New Material Co., Ltd., Qingdao (CN)

(72) Inventor: Xuelei Song, Qingdao (CN)

(73) Assignee: Qingdao Yuyuan New Material Co., Ltd., Qingdao (CN)

( * ) Notice: Subject to any disclaimer, the term of this patent is extended or adjusted under 35 U.S.C. 154(b) by 11 days.

(21) Appl. No.: 17/086,558

(22) Filed: Nov. 2, 2020

(65) Prior Publication Data

US 2021/0154731 A1 May 27, 2021

(30) Foreign Application Priority Data

Nov. 4, 2019 (CN) .......................... 201911067014.4

(51) Int. Cl.
*B22D 17/00* (2006.01)
*B22D 21/00* (2006.01)
*H01M 50/204* (2021.01)

(52) U.S. Cl.
CPC .......... *B22D 17/007* (2013.01); *B22D 21/007* (2013.01); *H01M 50/204* (2021.01)

(58) Field of Classification Search
CPC ...... B22D 17/00; B22D 17/007; B22D 21/00; B22D 21/007; H01M 50/204; H01M 50/244; H01M 50/249; H01M 50/262; H01M 2220/20

USPC ................................. 164/113, 900; 429/100
See application file for complete search history.

(56) References Cited

U.S. PATENT DOCUMENTS 9,620,844 B2 * 4/2017 Kim et al. .......... H04M 1/0274

* cited by examiner

*Primary Examiner* — Kevin P Kerns
(74) *Attorney, Agent, or Firm* — The Dobrusin Law Firm, PC

(57) ABSTRACT

A method for forming a battery bracket by semi-solid die casting, where the battery bracket is prepared by semi-solid die casting. The method includes: preparing an aluminum alloy raw material into liquid aluminum alloy, and incubating the liquid aluminum alloy at a first preset temperature; delivering the liquid aluminum alloy to a slurry machine for stirring to obtain a semi-solid slurry; pouring the semi-solid slurry into a die-casting machine for die-casting forming to obtain a prototype of the battery bracket; and subjecting the formed prototype of the battery bracket to solution treatment at a second preset temperature and then to aging treatment at a third preset temperature to obtain the battery bracket; where, the battery bracket mold structurally matches the battery bracket, and gates are disposed at positions in the battery bracket mold corresponding to threaded connections of a first boss and a second boss of the battery bracket, respectively.

10 Claims, 2 Drawing Sheets

METHOD FOR FORMING BATTERY BRACKET BY SEMI-SOLID DIE CASTING

TECHNICAL FIELD

The disclosure relates to the field of semi-solid die casting, and in particular to a method for forming a battery bracket by semi-solid die casting.

BACKGROUND

A battery is an important component of the electrical system of a commercial vehicle. Generally, the battery is hung on the chassis of the commercial vehicle through a suspension bracket. In addition to the gravity of a battery, a battery bracket also has to withstand various stresses under various complex working conditions during the travel of a commercial vehicle. Under complex and harsh stress conditions, the battery bracket is one of the key stressed components on the chassis of a commercial vehicle.

An existing battery bracket can be prepared by semi-solid die casting, but a prepared battery bracket has insufficient strength and is prone to damage during use.

SUMMARY

In view of this, the disclosure provides a method for forming a battery bracket by semi-solid die casting, which can improve the strength of a battery bracket, and especially can enhance the strength at the stressed thread of a battery bracket.

One aspect of the disclosure provides a method for forming a battery bracket by semi-solid die casting, where: the battery bracket is prepared by semi-solid die casting, and the method includes:

placing an aluminum alloy raw material in a melting furnace, heating the aluminum alloy raw material in the melting furnace to obtain liquid aluminum alloy, and incubating the liquid aluminum alloy at a first preset temperature;

delivering the liquid aluminum alloy to a slurry machine, and stirring the liquid aluminum alloy by the slurry machine to obtain a semi-solid slurry;

pouring the semi-solid slurry into a die casting machine, and die-casting the semi-solid slurry into a battery bracket mold via the die-casting machine for die-casting forming to obtain a prototype of the battery bracket;

where, the battery bracket mold structurally matches the battery bracket; and gates are disposed at positions in the battery bracket mold corresponding to threaded connections of a first boss and a second boss of the battery bracket, respectively;

subjecting the formed prototype of the battery bracket to solution treatment at a second preset temperature and then to aging treatment at a third preset temperature to obtain the battery bracket;

where, the battery bracket includes a first bracket, a connecting bracket and a second bracket, and the first bracket, the connecting bracket and the second bracket are successively connected into an I-shape;

a surface of the first bracket is provided with a first fixing hole, and a surface of the second bracket is provided with a second fixing hole;

a surface of the first bracket is provided with a first boss, the first boss is provided with a first connecting hole that penetrates the first boss and the first bracket, and the first connecting hole is provided with an internal thread;

a surface of the second bracket is provided with a second boss, the second boss is provided with a second connecting hole that penetrates the second boss and the second bracket, and the second connecting hole is provided with an internal thread; and the internal thread on the first connecting hole has a same size and direction of rotation as the internal thread on the second connecting hole.

In a possible implementation, during the semi-solid die casting, an air vent is disposed at a middle position in the battery bracket mold that is corresponding to the connecting bracket of the battery bracket; and a punch hole is disposed at a position in the battery bracket mold that is corresponding to a surface of the connecting bracket of the battery bracket, and the center of the punch hole is arranged to coincide with the center of the connecting bracket.

In a possible implementation, the first preset temperature ranges from 650° C. to 660° C.; and the slurry machine adopts mechanical spiral stirring, where, the liquid aluminum alloy is stirred in the slurry machine at 95 r/min to 105 r/min for 90 s to 110 s to obtain the semi-solid slurry.

In a possible implementation, when the semi-solid slurry is poured into a die-casting chamber of the semi-solid die-casting machine, the semi-solid die-casting machine is running at the following parameters: injection speed: 5 m/s to 10 m/s, injection specific pressure: 20 MPa to 50 MPa, and pressure holding time; 27 s to 33 s.

In a possible implementation, during the solution treatment, the second preset temperature ranges from 490° C. to 510° C., and the incubation is conducted for 7.5 h to 8.5 h;

where, after the prototype of the battery bracket is subjected to solution treatment at the second preset temperature, the method further includes the step of quenching a resulting prototype of the battery bracket with water at a water temperature not exceeding 100° C.;

during the aging treatment, the third preset temperature ranges from 160° C. to 180° C., and the incubation is conducted for 9.5 h to 10.5 h;

where, after the prototype of the battery bracket is subjected to the aging treatment at the third preset temperature, the method further includes the step of air-cooling a resulting prototype of the battery bracket.

In a possible implementation, the solution treatment is conducted at the second preset temperature of 500° C., and the incubation is conducted for 8 h; and the aging treatment is conducted at the third preset temperature of 170° C., and the incubation is conducted for 10 h.

In a possible implementation, a high-strength Al—Si—Cu—Mg aluminum alloy material is used as the aluminum alloy raw material.

In a possible implementation, in the high-strength Al—Si—Cu—Mg aluminum alloy material, the content of Si is 5.5 wt % to 6.5 wt %, the content of Mg is 0.3 wt % to 0.45 wt %, the content of Cu is 3 wt % to 4 wt %, and the balance is Al.

In a possible implementation, before the semi-solid slurry is die-casted into the battery bracket mold, the method further includes preheating the battery bracket mold to 200° C. to 260° C.

In a possible implementation, after the formed prototype of the battery bracket is subjected to solution treatment at the second preset temperature and, then to aging treatment at the third preset temperature to obtain the battery bracket, the method further includes:

subjecting the threaded connections of the first boss and the second boss of the battery bracket to thread processing by a machine tool.

In the method for forming a battery bracket by semi-solid die casting of an example of the disclosure, the method of processing an aluminum alloy raw material into a prototype of the battery bracket according to the description of preparing, the battery bracket by the aforementioned semi-solid die casting refers to a semi-solid rheo-die casting (RDC) process. Compared with an original casting process, the semi-solid RDC process has advantages, such as low energy consumption, high precision, prominent compactness, and excellent mechanical properties of castings. Solution treatment and aging treatment after the semi-solid RDC can improve the performance of a product itself, so that use requirements can be met or the performance of the product can be further improved after the use requirements are met. A gate is disposed at a threaded connection of a battery bracket mold to ensure the thread strength of a battery bracket. In summary, the method for forming a battery bracket by semi-solid die casting of an example of the disclosure can realize weight reduction for a battery bracket, and especially can increase the strength of the stressed thread part and extend the service life.

A battery bracket is arranged into an, shape to increase the strength, and service life of the battery bracket, which also lowers the manufacturing difficult of the battery bracket, A first fixing hole disposed on a first bracket and a second fixing hole disposed on a second bracket are used for connecting to corresponding positions of a vehicle chassis. A first connecting hole disposed on a first boss and a second connecting hole disposed on a second boss are used for connecting a battery, and the thickness of a stressed surface is increased by the first boss and the second boss, thereby increasing the strength of a battery bracket. In addition, an aluminum alloy material is lighter than a cast iron material, and the overall weight can be reduced by more than 70%, exhibiting a significant weight-reducing effect, According to the following detailed description of exemplary examples with reference to the accompanying drawings, other features and aspects of the disclosure will become clear.

BRIEF DESCRIPTION OF DRAWINGS

The accompanying drawings included in the specification and constituting a part of the specification, together with the specification, illustrate exemplary examples, features, and aspects of the disclosure, and are used to explain the principle of the disclosure.

DETAILED DESCRIPTION

Figure 1:
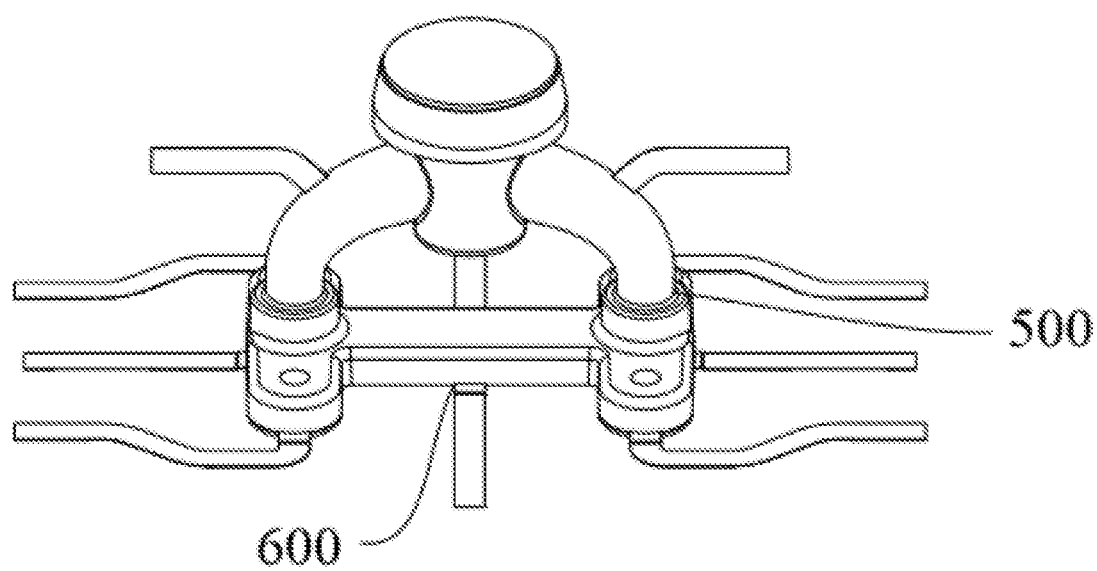
FIG. 1 shows a schematic diagram of a battery bracket mold for the method for forming a battery bracket by semi-solid die casting according to an example of the disclosure.

Various exemplary examples, features, and aspects of the disclosure will be described in, detail below with reference to the drawings. The same reference numerals in the drawings indicate elements with the same or similar functions. Although various aspects of the examples are shown in the drawings, unless otherwise noted, the drawings are not necessarily drawn to scale, It should be understood that the orientation or position relationships indicated by terms "central", "longitudinal", "transverse", "length", "width", "upper", "lower", "front", "back", "left", "right", "vertical", "horizontal", "top", "bottom", "inner", "outer", "clockwise", "anticlockwise", "axial", "radial", "circumferential" etc. are orientation or position relationships as shown in the drawings, and these terms are merely intended to facilitate the description of the disclosure or simplify the description, rather than to indicate or imply that the mentioned apparatus or elements must have a specific orientation or be constructed and operated in a specific orientation. Therefore, these terms may not be construed as a limitation to the disclosure.

Moreover, the terms such as "first" and "second" are used only for the purpose of description and cannot be understood as indicating or implying relative importance or implicitly indicating the number of technical features denoted. Thus, features defined with "first" and "second" may explicitly or implicitly include one or more of the features. In the description of the disclosure, "a plurality of" means two or more, unless otherwise specifically defined.

The dedicated word "exemplary" here means "serving as an example, embodiment, or illustration". Any example described herein as "exemplary" need not be construed as being superior to or better than other examples.

In addition, to better illustrate the disclosure, numerous specific details are given in the following specific implementations. Those skilled in the art should understand that the disclosure can also be implemented without certain specific details. In some examples, the methods, means, elements, and circuits well-known to those skilled in the art are not described in detail in order to highlight the subject matter of the disclosure.

FIG. 1 shows a schematic diagram of a battery bracket mold for the method for forming a battery bracket by semi-solid die casting according to are example of the disclosure. As shown in FIG. 1, the method for forming a battery bracket by semi-solid die casting of an example of the disclosure, where the battery bracket is prepared by semi-solid die casting, includes: placing an aluminum alloy raw material in a melting furnace, heating the aluminum alloy raw material in the melting furnace to obtain liquid aluminum alloy, and incubating the liquid aluminum alloy at a first preset temperature; delivering the liquid aluminum alloy to a slurry machine, and stirring the liquid aluminum alloy by the slurry machine to obtain a semi-solid slurry; pouring the semi-solid slurry into a die-casting machine, and die-casting the semi-solid slurry into a battery bracket mold via the die-casting machine for die casting forming to obtain a prototype of the battery bracket; where, the battery bracket mold structurally matches the battery bracket; and gates 500 are disposed at positions in the battery bracket mold corresponding to threaded connections of a first boss 130 and a second boss 330 of the battery bracket, respectively; and subjecting the formed prototype of the battery bracket to solution treatment at a second preset temperature and then to aging treatment at the third preset temperature to obtain the battery bracket.

Figure 2:
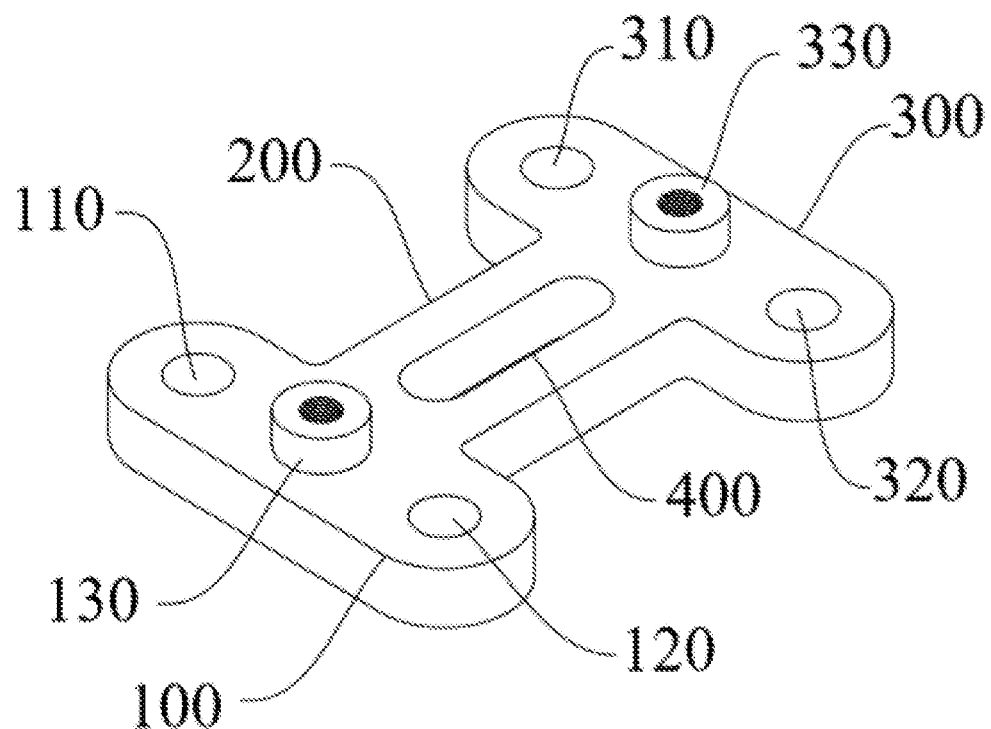
FIG. 2 shows an isometric view of a battery bracket prepared by the method for forming battery bracket by semi-solid die casting according to an example of the disclosure.
Figure 3:
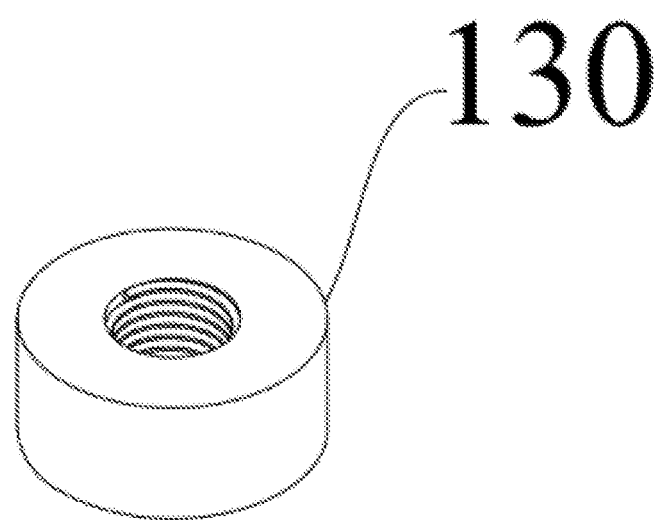
FIG. 3 shows a partial enlarged view of a tint boss obtained from the method for forming a battery bracket by semi-solid die casting according to an example of the disclosure.

As shown in FIG. 2 or FIG. 3, the battery bracket includes a first bracket 100, a connecting bracket 200 and a second bracket 300, and the first bracket 100, the connecting bracket 200 and the second bracket 300 are successively connected into an I-shape. A snake of the first bracket 100 is provided with a first fixing hole, and a surface of the second bracket 300 is provided with a second fixing hole. A surface of the first bracket 100 is provided with a first boss 130, the first boss 130 is provided with a first connecting hole that penetrates the first boss 130 and the first bracket 100, and the first connecting hole is provided with an internal thread. A surface of the second bracket 300 is provided with a second boss 330, the second boss 330 is provided with a second connecting hole that penetrates the second boss 330 and the second bracket 300, and the second connecting hole is provided, with an internal thread. The internal thread on the first connecting hole has a same size and direction of rotation as the internal thread on the second connecting hole.

As shown in FIG. 1, in the method for forming a battery bracket by semi-solid die casting of an example of the disclosure, the method of processing an aluminum alloy raw material into a prototype of the battery bracket according to the description of preparing the battery bracket by the aforementioned semi-solid die casting refers to a semi-solid RDC process. Compared with an original casting process, the semi-solid RDC process has advantages, such as low enemy consumption, high precision, prominent compactness, and excellent mechanical properties of castings. Solution treatment and aging treatment after the semi-solid RDC can improve the performance of a product itself, so that use requirements can be met or the performance of the product can be further improved, after the use requirements are met. A gate 500 is disposed at a threaded connection of a battery bracket mold to ensure the thread strength of a battery bracket. In summary, the method for forming a battery bracket by semi-solid die casting of an example of the disclosure can realize weight reduction for a battery bracket, and especially can increase the strength of the stressed thread part and extend the service life.

As shown in FIG. 2 or FIG. 3, a battery bracket is arranged into an I shape to increase the strength and service life of the battery bracket, which also lowers the manufacturing difficulty of the battery bracket. A first fixing hole disposed on a first bracket 100 and a second fixing hole disposed on a second bracket 300 are used for connecting to corresponding positions of a vehicle chassis. A first connecting hole disposed on a first boss 130 and a second connecting hole disposed on a second boss 330 are used for connecting a battery, and the thickness of a stressed surface is increased by the first boss 130 and the second boss 330, thereby increasing the strength of a battery bracket. A punch hole 400 provided on the connecting bracket 200 is initially arranged in a non-stressed part of the connecting bracket 200, which reduces the weight of a battery bracket. In addition, an aluminum alloy material is lighter than a cast iron material, and the overall weight can be reduced by more than 70%, exhibiting a significant weight-reducing effect.

The semi-solid RDC process includes: feeding liquid aluminum alloy with low degree of superheat at a first preset temperature into a slurry machine via a pouring ladle; stirring the liquid aluminum alloy in the slurry machine for a short time, where the liquid aluminum alloy will become a semi-solid slurry when cooled to a preset temperature or solid fraction below the liquidus temperature; and directly pouring the semi-solid slurry and then die-casting into a battery bracket mold for die-casting, Herein, it should be noted that the stirring in the slurry machine can be conducted by mechanical stirring or electromagnetic stirring.

Herein, it should be noted that high-pressure feeding will occur during the semi-solid RDC, which ensures that an internal thread structure is compact and has no defects.

During high-pressure feeding, flow feeding or overall flow feeding can be adopted. At a low solid fraction, the flow feeding is realized through the solid phase gap, and at a high solid fraction, the overall rheological feeding is realized through the solid phase deformation. Moreover, the feeding pressure during high-pressure feeding is greater than the overall rheological resistance of the semi-solid slurry during the semi-solid RCD. In addition, a target pressure for pressurization must be reached before the semi-solid slurry starts to solidify, and the time for pressurization feeding must be longer than the solidification time. Under the action of pressure, the rheological speed of the semi-solid slurry is greater than the shrinking speed.

Herein, it should be noted that the first fixing hole includes a first through-hole 110 and a second through-hole 120, and the first through-hole 110 and the second through-hole 120 are arranged to penetrate through the surface of the first bracket 100. A line connecting the center of the first through-hole 110 and the center of the second through-hole 120 is perpendicular to the center line along the width of the connecting bracket 200, and the first through-hole 110 and the second through-hole 120 are located away from each other. The second fixing hole includes a third through-hole 310 and a fourth through-hole 320, and the third through-hole 310 and the fourth through-hole 320 are arranged to penetrate through the surface of the second bracket 300. A line connecting the center of the third through-bole 310 and the center of the fourth through-hole 320 is parallel to the line connecting the center of the first through-hole 110 and the center of the second through-hole 120.

In a possible implementation, the first preset temperature ranges from 650° C. to 660° C., and the stirring is conducted by mechanical stirring. The liquid aluminum alloy is stirred in the slurry machine at 95 r/min to 105 r/min for 90 s to 110 s to obtain the semi-solid slurry. Herein, it should be noted that the mechanical stirring may adopt spiral stirring or rod stirring, and the semi-solid die casting for the battery bracket in an example of the disclosure adopts spiral stirring. The method of mechanical spiral stirring requires simple equipment and low cost, can achieve a high shear rate, and is conducive to the formation of fine spherical microstructures, which enhances the overall fluidity of the liquid aluminum alloy, and makes the liquid aluminum alloy produce downward pressure to promote pouring, thereby improving the production efficiency and quality.

Herein, it should also be noted that a preferred stirring rate of the slurry machine is tested as 100 r/min, and at this stirring rate, the liquid aluminum alloy can exhibit excellent fluidity, and can also be prevented from splashing out of the slurry machine to the greatest extent. The stirring is conducted for 100 s, and in this case, the liquid aluminum alloy can be fully stirred to form a semi-solid slurry, and time waste is avoided at the same time.

In a possible implementation, during the semi-solid die casting, an air vent 600 is disposed at a middle position in the battery bracket mold that is corresponding to the connecting bracket 200 of the battery bracket. As a result, the front-end gas and oxide impurities are ensured to be discharged from a component body, and the performance of a battery bracket at the final filling position is also guaranteed. Herein, it should be noted that the total cross-sectional area of the air vent 600 can be adopted according to the flow rate of the semi-solid slurry filled through the inner gate 500, the square root of the mold temperature, and the open coefficient of the air vent 600. It can also further reduce the weight of a battery bracket. Herein, it should also be noted that the mold should also be provided with an overflow groove to prevent a cold shut detect from occurring in a battery bracket.

Herein, it should also be noted that the air vent 600 and the overflow groove belong to an exhausting and flooding system, which can ensure that the performance of a battery bracket itself meets the use requirements. Moreover, the air vent 600 and the overflow groove need to be arranged according to the actual temperature, the fluidity of the semi-solid slurry and the like, so as to ensure the smooth discharge of liquids and gases.

In addition, it should also be, noted that, in a battery bracket mold used in the method for forming a battery bracket by semi-solid die casting of the application, a punch hole 400 is disposed at a position that is corresponding to a surface of the connecting bracket 200 of the battery bracket, and the center of the punch hole 400 is arranged to coincide with the center of the connecting bracket 200. Therefore, when the battery bracket mold is used to die-cast a battery bracket, the center part of the connecting plate of a prepared battery bracket (namely, a non-stressed part of the connecting plate) has a hollow structure, which further reduces the weight of the battery bracket while ensuring the stability and strength of the battery bracket.

In a possible implementation, when the semi-solid slurry is poured into a die-casting chamber of the semi-solid die-casting machine, the semi-solid die-casting machine is running at the following parameters: injection speed: 5 m/s to 10 m/s, and injection specific pressure: 20 MPa to 50 MPa, and the pressure is held for 27 s to 33 s before the molding is started. Herein, it should be noted that there is a very short pressurization phase before the pressure holding, and the pressurization time is less than 0.1 s. The pressure holding time is preferably 30 s according to experiments.

In a possible implementation, the second preset temperature for the solution treatment ranges from 490° C. to 510° C. and the incubation is conducted for 7.5 h to 8.5 h. After the prototype of the battery bracket is subjected to solution treatment at the second preset temperature, the method further includes the step of quenching a resulting prototype of the battery bracket with water at a water temperature not exceeding 100° C. During the aging treatment, the third preset temperature ranges from 160° C. to 180° C., and the incubation is conducted for 9.5 h to 10.5 h. After the prototype of the battery bracket is subjected to the aging treatment at the third preset temperature, the method further includes the step of air-cooling a resulting prototype of the battery bracket.

Furthermore, in a possible implementation, the solution treatment is conducted at the second preset temperature of 500° C., and the incubation is conducted for 8 h. The aging treatment is conducted at the third preset temperature of 170° C., and the incubation is conducted for 10 h. As a result, the body of an obtained battery bracket has a hardness greater than 100 HB and a yield strength greater than 300 MPa, which meets the design requirements and the requirements for the strength, of aluminum alloy threaded connections. Moreover, the obtained battery bracket has excellent mechanical properties.

In a possible implementation, the first bracket 100, the connecting bracket 200, the second bracket 300, the first boss 130 and the second boss 330 are made of a high-strength Al—Si—Cu—Mg aluminum alloy material. The high-strength Al—Si—Cu—Mg aluminum alloy material has a high strength, and so a prepared battery bracket has higher strength.

Furthermore, in a possible implementation, in the high-strength Al—Si—Cu—Mg aluminum alloy material: the content of Si is 5.5 wt % to 6.5 wt %, the content of Mg is 0.3 wt % to 0.45 wt %, the content of Cu is 3 wt % to 4 wt %, and the rest is Al.

Furthermore, in a possible implementation, the high-strength Al—Si—Cu—Mg aluminum alloy material is an Al-6Si-3.5Cu-0.4Mg aluminum alloy material. The Al-6Si-3.5Cu-0.4Mg aluminum alloy material has superior performance among Al—Si—Cu—Mg aluminum alloys, which can further improve the strength of a battery bracket.

In a possible implementation, a battery bracket mold needs to be preheated before being used, so as to reduce thermal and cold stresses for the mold and extend the service life of the mold. In addition, a suitable mold temperature can also promote the realization of a prominent exhausting effect, and further promote the exhaust of oxide inclusions from the body of a battery bracket. It also effectively avoids the deformation and cracks of a batter y bracket caused by the shrinkage of the battery bracket during casting. A battery bracket mold needs to be preheated to above 200° C. to ensure the mechanical properties of a battery bracket.

Furthermore, in a possible implementation, a battery bracket mold is ensured to be preheated at a temperature of 200° C. to 260° C. to exhibit the optimal state, and an excessively-high temperature will also reduce the mechanical properties of a battery bracket.

In a possible implementation, the threaded connections of the first boss 130 and the second boss 330 of the battery bracket are subjected to thread processing by a machine tool.

Herein, it should be also noted that the thread can be provided by thread boring or milling, or can be provided by drilling on a drilling machine with a drill, or can be provided by thread tapping or chasing. If the first and second connecting holes have a small pore size, thread tapping or chasing may be adopted; and if the first and second connecting holes do not have a small pore size, thread milling may be adopted.

In a possible implementation, a battery bracket mold needs to be sprayed with a release agent before the battery bracket mold is closed. The release agent can prevent the problem that a battery bracket mold is difficult to be opened due to a large force required for opening the mold. When the release agent is sprayed, it is necessary to avoid the phenomenon of spraying too much or too little or missing somewhere. The release agent can be sprayed at a higher amount at positions where demolding is difficult, and the release agent can be sprayed at a lower amount at positions where demolding is easy.

The method for forming a battery bracket by semi-solid die casting in an example of the disclosure is a method for forming a battery bracket by semi-solid die casting where aluminum alloy is used instead of steel and cast iron. The method for forming a battery bracket by semi-solid die casting in an example of the disclosure adopts a high-strength Al—Si—Cu—Mg aluminum alloy to prepare a battery bracket by semi-solid RDC, which is different from a conventional method where a battery bracket is prepared from cast iron. Moreover, the hollow structure design of a product is combined. Threads are provided on the body of an aluminum alloy product to connect with a battery. A product, after being formed, needs to be subjected to solution treatment and aging treatment to increase the strength and ensure that the product meets the use requirements. The aluminum alloy battery bracket product prepared by the method of the disclosure has a uniform and compact structure and prominent mechanical properties. Under the premise of meeting the requirements in use and performance for a product, the weight of the product can be reduced by more than 70%, exhibiting a significant weight-reducing effect.

The examples of the disclosure have been described above, and the above description is exemplary, not exhaustive, and is not limited to the disclosed examples, it is apparent to those skilled in the art that many modifications and changes may be made without departing from the scope and spirit of the described examples. The terms used herein are selected to best explain principles of the examples, practical applications, or improvements to technologies in the market, or to enable other persons of ordinary skill in the art to understand the examples disclosed herein.

What is claimed is:

1. A method for forming a battery bracket by semi-solid die casting, wherein: the battery bracket is prepared by semi-solid die casting, and the method includes:

placing an aluminum alloy raw material in a melting furnace, heating the aluminum alloy raw material in the melting furnace to obtain liquid aluminum alloy, and incubating the liquid aluminum alloy at a first preset temperature;

delivering the liquid aluminum alloy to a slurry machine, and stirring the liquid aluminum alloy by the slurry machine to obtain a semi-solid slurry;

pouring the semi-solid slurry into a die-casting machine, and die-casting the semi-solid slurry into a battery bracket mold via the die-casting machine for die-casting forming to obtain a prototype of the battery bracket;

wherein, the battery bracket mold structurally matches the battery bracket; and gates are disposed at positions in the battery bracket mold corresponding to threaded connections of a first boss and a second boss of the battery bracket, respectively;

subjecting a formed prototype of the battery bracket to solution treatment at a second preset temperature and then to aging treatment at a third preset temperature to obtain the battery bracket;

wherein, the battery bracket comprises a first bracket, a connecting bracket and a second bracket, and the first bracket, the connecting bracket and the second bracket are successively connected into an I-shape;

a surface of the first bracket is provided with a first fixing hole, and a surface of the second bracket is provided with a second fixing hole;

a surface of the first bracket is provided with a first boss, the first boss is provided with a first connecting hole that penetrates the first boss and the first bracket, and the first connecting hole is provided with an internal thread;

a surface of the second bracket is provided with a second boss, the second boss is provided with a second connecting hole that penetrates the second boss and the second bracket, and the second connecting hole is provided with an internal thread; and the internal thread on the first connecting hole has a same size and direction of rotation as the internal thread on the second connecting hole.

2. The method for forming a battery bracket by semi-solid die casting according to claim 1, wherein: during the semi-solid die casting, an air vent is disposed at a middle position in the battery bracket mold that is corresponding to the connecting bracket of the battery bracket; and a punch hole is disposed at a position in the battery bracket mold that is corresponding to a surface of the connecting bracket of the battery bracket, and a center of the punch hole is arranged to coincide with a center of the connecting bracket.

3. The method for forming a battery bracket by semi-solid die casting according to claim 1, wherein: the first preset temperature ranges from 650° C. to 660° C.; and the slurry machine adopts mechanical spiral stirring, wherein, the liquid aluminum alloy is stirred in the slurry machine at 95 r/min to 105 r/min for 90 s to 110 s to obtain the semi-solid slurry.

4. The method for forming a battery bracket by semi-solid die casting according to claim 1, wherein: when the semi-solid slurry is poured into a die-casting chamber of a semi-solid die-casting machine, the semi-solid die-casting machine is running at the following parameters: injection speed: 5 m/s to 10 m/s, injection specific pressure: 20 MPa to 50 MPa, and pressure holding time: 27 s to 33 s.

5. The method for forming a battery bracket by semi-solid die casting according to claim 1, wherein: during the solution treatment, the second preset temperature ranges from 490° C. to 510° C., and an incubation is conducted for 7.5 h to 8.5 h;

wherein, after the prototype of the battery bracket is subjected to solution treatment at the second preset temperature, the method further comprises the step of quenching a resulting prototype of the battery bracket with water at a water temperature not exceeding 100° C.;

during the aging treatment, the third preset temperature ranges from 160° C. to 180° C., and the incubation is conducted for 9.5 h to 10.5 h;

wherein, after the prototype of the battery bracket is subjected to the aging treatment at the third preset temperature, the method further comprises the step of air-cooling a resulting prototype of the battery bracket.

6. The method for forming a battery bracket by semi-solid die casting according to claim 5, wherein: the solution treatment is conducted at the second preset temperature of 500° C., and the incubation is conducted for 8 h; and the aging treatment is conducted at the third preset temperature of 170° C., and the incubation is conducted for 10 h.

7. The method for forming a battery bracket by semi-solid die casting according to claim 1, wherein: a high-strength Al—Si—Cu—Mg aluminum alloy material is used as the aluminum alloy raw material.

8. The method for forming a battery bracket by semi-solid die casting according to claim 7, wherein: in the high-strength Al—Si—Cu—Mg aluminum alloy material, the content of Si is 5.5 wt % to 6.5 wt %, the content of Mg is 0.3 wt % to 0.45 wt %, the content of Cu is 3 wt % to 4 wt %, and the balance is Al.

9. The method for forming a battery bracket by semi-solid die casting according to claim 1, wherein: before the semi-solid slurry is die-casted into the battery bracket mold, the method further comprises preheating the battery bracket mold to 200° C. to 260° C.

10. The method for forming a battery bracket by semi-solid die casting according to claim 1, wherein, after a formed prototype of the battery bracket is subjected to solution treatment at the second preset temperature and then to aging treatment at the third preset temperature to obtain the battery bracket, the method further comprises:

subjecting the threaded connections of the first boss and the second boss of the battery bracket to thread processing by a machine tool.

* * * * *